(12) United States Patent
Rabiei

(10) Patent No.: US 8,114,191 B2
(45) Date of Patent: Feb. 14, 2012

(54) ENERGY EFFICIENT APPROACH TO $CO_2$ CAPTURE PROCESS

(75) Inventor: Shahryar Rabiei, Greer, SC (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 12/332,498

(22) Filed: Dec. 11, 2008

(65) Prior Publication Data

US 2010/0147148 A1   Jun. 17, 2010

(51) Int. Cl.
*B01D 53/22* (2006.01)
(52) U.S. Cl. .......................... 95/4; 95/51; 96/9
(58) Field of Classification Search .................. None
See application file for complete search history.

(56) References Cited

U.S. PATENT DOCUMENTS

| | | | | |
|---|---|---|---|---|
| 4,264,338 A | * | 4/1981 | Null ................................. | 95/47 |
| 4,386,944 A | * | 6/1983 | Kimura ............................ | 95/51 |
| 5,693,121 A | | 12/1997 | Callahan et al. | |
| 5,724,805 A | * | 3/1998 | Golomb et al. ................. | 60/783 |
| 6,128,919 A | * | 10/2000 | Daus et al. ...................... | 62/624 |
| 2003/0131726 A1 | | 7/2003 | Thomas et al. | |
| 2006/0162555 A1 | * | 7/2006 | Asen et al. ....................... | 95/54 |
| 2008/0127632 A1 | * | 6/2008 | Finkenrath et al. ............. | 60/274 |
| 2010/0236404 A1 | * | 9/2010 | Baker et al. ..................... | 95/46 |

FOREIGN PATENT DOCUMENTS

DE   102007011879 A1   9/2008

OTHER PUBLICATIONS

European Search Report and opinion dated Mar. 16, 2010.
Aspelunf, "Gas conditioning—The interface between co2 capture and transport", International Journal of Greenhouse Gas Control i (2007) pp. 343-354.
Bouton G. and Luyben W., 2008, "Optimum Economic Design and Control of a Gas Permeation Membrane Coupled with the Hydrodealkylation (HDA) Process," American Chemical Society—Ind. Eng. Chem. Res. 2008, Chemical Engineering Department, Lehigh University, Bethlehem, Pennsylvania, vol. 47, pp. 1221-1237.
Figueroa, A. Fout, T., Plasynski, S., McIlvried, H., Srivastava, R., 2007, "Advances in Co2 Capture Technology—The U.S. Department of Energy Carbon Sequestration Program," International Journal of Greenhouse Gas Control, vol. 2, pp. 9-20.
Shao, P. and Huang, R.Y.M., "On the Profile of Gas Pressure Drops in the Bore of Hollow Fiber Membranes," Journal of Membrane Science, vol. 294, Issues 1-2, May 15, 2007, pp. 213-215.
Walawender, W.P. and Stern, S.A., "Analysis of Membrane Separation Parameters. II. countercurrent and Cocurrent Flow in a Single Permeation Stage," Separation Science, 7(5), pp. 553-584, 1972.
Singh, D.J., Croiset, E., Douglas, P.L. "Co2 Capture Options for an Existing Coal Fired Power Plant: 02/CO2 Recycle combustion vs. Amine Scrubbing," CANMET Energy Technology Centre, Natural Resources Canada.

* cited by examiner

*Primary Examiner* — Duane Smith
*Assistant Examiner* — Pankti Patel
(74) *Attorney, Agent, or Firm* — Pearne & Gordon LLP

(57) ABSTRACT

A system for capturing carbon dioxide is provided including a feed line transporting an exhaust gas, a first separator, a first compressor, a first membrane, a first ejector, a second separator, a second compressor, and a carbon dioxide storage tank. The first membrane is configured to filter the exhaust gas into a retentate stream of exhaust gas and a permeate stream of exhaust gas. The permeate stream of exhaust gas includes a larger amount of carbon dioxide than the retentate stream. The first ejector is configured to compress the permeate stream. The second compressor is configured to further compress the exhaust gas received from the second separator. The carbon dioxide storage tank is configured to receive the exhaust gas from the second compressor. A second membrane can be on the retentate stream of the first membrane, where a second ejector is on the permeate side of the second membrane.

7 Claims, 1 Drawing Sheet

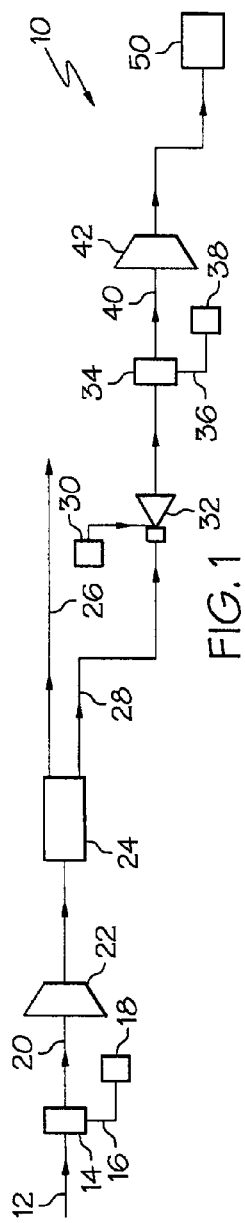
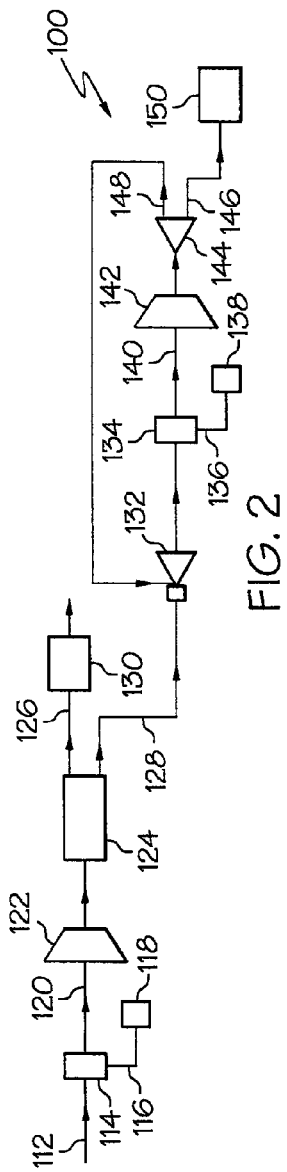
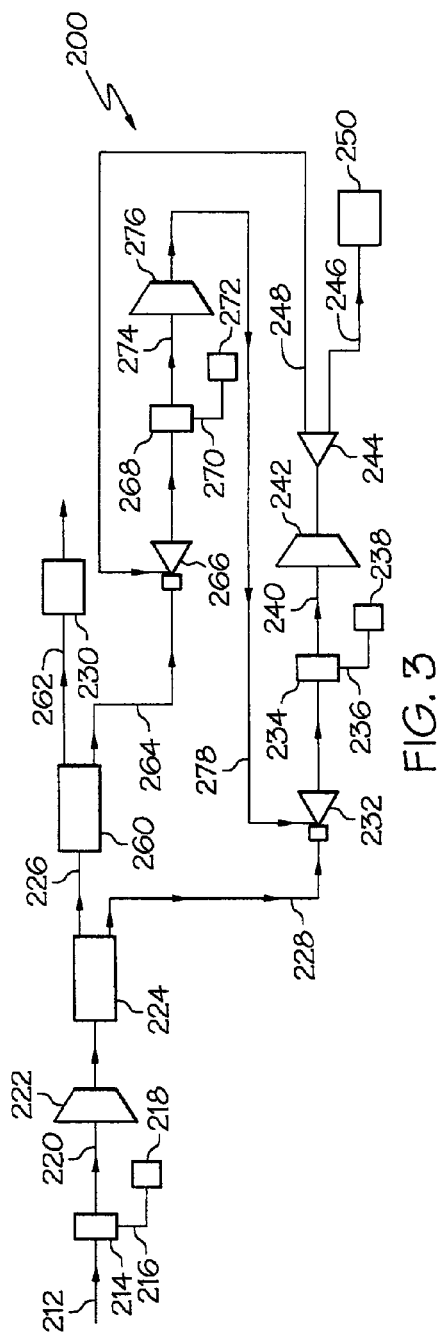

ENERGY EFFICIENT APPROACH TO CO$_2$ CAPTURE PROCESS

BACKGROUND OF THE INVENTION

The present invention relates generally to reducing CO$_2$ emissions from exhaust gases. The exhaust gas can be produced by an energy plant, such as a coal plant or other power plant. It is beneficial to develop technologies for mitigating CO$_2$ emissions from various sources that produce exhaust gases to reduce their contribution to the environment.

Membranes have attracted attention as a potential solution technology for various gas separation unit operations. However, there have been concerns about the practicality of membranes for capturing CO$_2$ in this field. For example, the compression of flue/exhaust gas of approximately 10 bars ($1\times10^6$ Pascals) or more is considered necessary when using membranes. The energy requirement and costs associated with the compression of such large volumes of flue/exhaust gas is a concern. Another concern is the need to compress a permeated CO$_2$ gas, which is often considered a necessary step for successful sequestration of the CO$_2$. The compression of the permeated CO$_2$ gas can also impose an unaffordable energy burden on the industrial processes. Steam is often suggested as a sweep-gas to reduce the CO$_2$ partial pressure on the permeate side of the membrane. It has been shown that the energy required to generate the sweep-gas is also cost-prohibitive. Accordingly, there is a need to address at least each of the above concerns with CO$_2$ mitigation simultaneously in currently available membranes and when desiring to perform CO$_2$ sequestration.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a system for capturing carbon dioxide is provided that includes a feed line transporting an exhaust gas, a first separator configured to draw liquid off the exhaust gas, a first compressor configured to compress the exhaust gas, a first membrane, a first ejector, a second separator, a second compressor, and a carbon dioxide storage tank. The first membrane is configured to filter the exhaust gas received from the first compressor into a retentate stream of exhaust gas and a permeate stream of exhaust gas. The permeate stream of exhaust gas includes a larger amount of carbon dioxide than the retentate stream of exhaust gas. The first ejector is configured to compress the permeate stream of exhaust gas. The second separator is configured to draw liquid off the exhaust gas received from the first ejector. The second compressor is configured to further compress the exhaust gas received from the second separator. The carbon dioxide storage tank is configured to receive a portion of the exhaust gas from the second compressor.

In accordance with another aspect of the present invention, a system for capturing carbon dioxide includes a feed line transporting an exhaust gas, a first separator configured to draw liquid off the exhaust gas, a first compressor configured to compress the exhaust gas received from the first separator, a first membrane, a first ejector, a second separator, a second compressor, and a flow divider. The first membrane is configured to separate the exhaust gas received from the first compressor into a retentate stream of exhaust gas and a permeate stream of exhaust gas. The permeate stream of exhaust gas includes a larger amount of carbon dioxide than the retentate stream of exhaust gas. The first ejector is configured to compress the permeate stream of exhaust gas. The second separator is configured to draw liquid off the exhaust gas received from the first ejector. The second compressor is configured to further compress the exhaust gas received from the second separator. The flow divider is configured to divert the exhaust gas received from the second compressor to a carbon dioxide storage tank.

In accordance with another aspect of the present invention, a method for capturing carbon dioxide from an exhaust gas includes the steps of transporting exhaust gas to a first separator, separating the exhaust gas at the first separator into a gas in a first gaseous path and a liquid in a first liquid path, compressing the exhaust gas from the first gaseous path at a first compressor, and filtering the exhaust gas from the first compressor at a first membrane. The filtering step separates the exhaust gas received into a retentate stream of exhaust gas and a permeate stream of exhaust gas. The permeate stream of exhaust gas includes a larger amount of carbon dioxide than the retentate stream of exhaust gas. Other steps in the method include compressing the exhaust gas from the permeate stream at a first ejector, separating the exhaust gas at a second separator into a gas in a second gaseous path and a liquid in a second liquid path, compressing the exhaust gas from the second gaseous path at a second compressor, and transporting a portion of the exhaust gas from the second compressor to a carbon dioxide storage tank.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1 is a schematic process flow diagram of a first example system for capturing carbon dioxide from an exhaust gas;

FIG. 2 is a schematic process flow diagram of a second example system for capturing carbon dioxide from an exhaust gas; and FIG. 3 is a schematic process flow diagram of a third example system for capturing carbon dioxide from an exhaust gas.

DESCRIPTION OF EXAMPLE EMBODIMENTS

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

In FIG. 1, a first example of a system 10 in accordance with the present invention is shown. The first example system 10 is configured to capture carbon dioxide from an exhaust gas. The first example includes a feed line 12 that is configured to transport the exhaust gas. The feed line 12 can transport exhaust gas that it receives from a reactor, an energy producing facility, or an energy plant, such as a coal burning power plant or other power plant. Of course, the exhaust gas may come from another source. The first example can be used with exhaust gas that is not already pressurized. It is also appreciated that other apparatuses can be used with the feed line 12. The first example system 10 is configured to filter and capture carbon dioxide from a variety of exhaust gases.

A first separator 14 can be provided upstream from a first compressor 22. The first separator 14 can have a first liquid path 16, a first liquid storage 18, and a first gaseous path 20. The first separator 14 is configured to draw any liquid off the exhaust gas to prevent liquid from reaching the first compressor 22. The liquid can be transported to a first liquid storage 18 and can be recycled in the system 10 or transported to the exterior of the system 10 as desired. The separator 14 is configured to separate the liquid from the gas, as is generally known in the art and many different types of structure can be provided.

The first compressor 22 is provided that can be located downstream from the feed line 12. The first compressor 22 can be a multi-stage compressor that provides coolers between each stage of compression. The first compressor 22 is configured to compress the liquid-reduced exhaust gas.

A first membrane 24 is provided that can be located downstream from the first compressor 22. The first compressor 22 feeds the exhaust gas to the first membrane 24. It is appreciated that the first membrane 24 can be composed of a variety of materials and composite materials. The first membrane 24 is configured to filter $CO_2$ gas from the remaining portion of the exhaust gas by selective permeation through the membrane. The first membrane 24 can have a variety of porosities and can also be formed from a variety of polymeric structures. The size and thickness of the first membrane 24 can also be varied depending on the design and requirements of the energy plant. It is appreciated that any type of membrane can be used with the subject invention.

The first membrane 24 is configured to filter the exhaust gas received from the first compressor 22 that passes through the first membrane 24 into a retentate stream 26 of exhaust gas and a permeate stream 28 of exhaust gas. The permeate stream 28 of exhaust gas includes a larger amount of carbon dioxide than the retentate stream 26 of exhaust gas, as the membrane filters out other gases into the retentate stream 26. The retentate stream 26 thus includes material that is prevented from flowing through the membrane. The material, such as the $CO_2$ gas, that passes through the membrane goes into the permeate stream 28. The permeate stream 28 can be at a much lower pressure than the exhaust gas.

A first ejector 32 is provided that can be located downstream from the first membrane 24. The first ejector 32 is configured to provide a first portion of compression for the permeate stream 28 of exhaust gas. The first ejector 32 is configured to operate the membrane permeate side at subatmospheric conditions and to compress the $CO_2$ gas. A second separator 34 can also be provided upstream from a second compressor 42. The second separator 34 can have a second liquid path 36, a second liquid storage 38, and a second gaseous path 40. The second separator 34 is configured to draw any liquid off the exhaust gas to prevent liquid from reaching the second compressor 42. The liquid can be transported to a second liquid storage 38 and can be recycled in the system 10 or transported to the exterior of the system 10 as desired. Each separator 14, 34 is configured to separate the liquid from the gas, as is generally known in the art. Preventing liquid from reaching the compressors helps to ensure that the efficient compressor operation.

The second compressor 42 is provided downstream from the first ejector 32. The second compressor 42 is configured to further compress the permeate stream 28 of exhaust gas. The second compressor 42 can also be a multi-stage compressor that can also provide coolers between each stage of compression. The second compressor 42 provides a second or remaining portion of the compression for $CO_2$ gas. The first ejector 32 provides the first portion of the compression required for the $CO_2$ gas while the second compressor 42 provides the remaining portion of the compression required for eventual storage of the $CO_2$ gas.

The subject invention provides a practical way for using currently available membrane materials to effectively mitigate $CO_2$ without imposing an unreasonable energy burden on a power plant, an energy producing facility, or any other process that the subject invention is used with. The subject invention does not need the flue/exhaust gas to be compressed to high pressures by the first compressor 22, instead, it helps to provide the required pressure gradient by vacuuming the permeate side using the first ejector 32. The ejectors can also create or control the pressure of the permeate stream 28 for optimized permeation of the gases through the first membrane 24. Thus, the ejectors located on the permeate side of the membrane units minimize the compression work required by the first compressor 22 that compresses the exhaust gas.

The first ejector 32 can be of one of a variety of examples. The first ejector 32 can be a low-cost gas-gas ejector and can have a variety of dimensions and specifications. The performance of the ejector 32 can be modified to obtain the most efficient performance in each example. The ejector can cost less than a compressor and can provide an increase in the pressure of the $CO_2$ gas while requiring less energy to operate than the compressor. The ejector 32 also further minimizes the $CO_2$ compression work needed by the second compressor 42 after the filtering function is performed by the membrane. The ejector 32 provides an increased pressure before the inlet of the second compressor 42 to reduce the work that must be performed by the second compressor 42. Thus, the first ejector 32 reduces the total energy needed by the second compressor 42 for compressing the exhaust/flue gas.

The first example provides a system 10 with a membrane that does not require a sweep steam. Sweep steam from water typically requires an unacceptable amount of energy. Instead of generating sweep steam, a partial pressure difference is created by vacuuming the permeate side of the membrane through the use of the first ejector 32, as shown in FIG. 1. The presence of moisture is sometimes pointed out as a necessity for boosting the molecular diffusion across the thickness of the membrane. This requirement can be satisfied by controlling the feed moisture and/or adding atomized water or steam at controlled rates to the first example system 10. Thus, the ejector and the avoidance of generating sweep steam will ensure minimization of the flue/exhaust compression work. The subject invention may reduce the total energy cost of the $CO_2$ capture process.

A carbon dioxide storage tank 50 can be provided that can be located downstream from the second compressor 42. The carbon dioxide storage tank 50 is configured for receiving a portion of the exhaust gas from the second compressor 42 that is rich in $CO_2$ gas. It is appreciated that the carbon dioxide storage tank 50 can be located at various distances from the second compressor 42. The carbon dioxide storage tank 50 can be any holding tank or facility that is configured to hold the carbon dioxide gas captured by use of the first example system 10. The carbon dioxide storage tank 50 can operate at higher pressures, such as 2000 psi, for example.

A second example system 100 for capturing carbon dioxide from an exhaust gas is shown in FIG. 2. It is appreciated that the components of the second example are similar in structure and functionality as the first example. The second example system 100 can include a feed line, a first separator 114, a first liquid path 116, a first liquid storage 118, a first gaseous path 120, a first compressor 122, a first membrane 124, a first retentate stream 126, a first permeate stream 128, an expander 130, a first ejector 132, a second separator 134, a second liquid path 136, a second liquid storage 138, a second gaseous path 140, a second compressor 142, a flow divider 144, a first path 146, a second path 148, and a carbon dioxide storage tank 150.

In the second example system 100, the expander 130 can be provided that can be located near the end of the retentate path to expel the non-$CO_2$ gas material through a vent. The expander 130 can be configured to expand the retentate stream 126 of exhaust gas before transporting the exhaust gas to the vent. The vent can expel the exhaust gas that has a reduced or negligible amount of carbon dioxide.

The flow divider 144 can also be provided and can be located downstream from the second compressor 142. The flow divider 144 is configured to divert the exhaust gas that is rich in carbon dioxide received from the second compressor 142 to the carbon dioxide storage tank 150. The flow divider 144 can be used to control the discharge rate of the gas after the second compressor 142 to transport the carbon dioxide from the exhaust gas to a gas storage tank. The flow divider 144 can also be configured to provide the first path 146 that transports exhaust gas at a specific rate to the carbon dioxide storage tank 150 or to a storage facility. The flow divider 144 can be configured to provide the second path 148 that diverts a second amount of exhaust gas at a specific rate such that it can be fed to the inlet of the first ejector 132. Recycling the pressurized gas to the first ejector 132 can help to increase the pressure of the gas entering the first ejector 132 as well as helping to reduce the work required by the second compressor 142. The gas diverted will also undergo additional processing by the first ejector 132, the second separator 134, and the second compressor 142. Both the expander 130 and the flow divider 144 can each be used in combination with the first example.

FIG. 3 shows a third example system 200 for capturing carbon dioxide from an exhaust gas. The third example system 200 includes a first membrane 224 and a second membrane 260. It is appreciated that the components of the third example are similar in structure and functionality as the first example and the second example. In the third example, a feed line 212 is configured to transport an exhaust gas. The feed line 212 can transport exhaust gas from a reactor, an energy producing facility, or an energy plant, such as a coal burning power plant or other power plant. It is also appreciated that other apparatuses can be used with the feed line 212. The third example system 200 is configured to filter and capture carbon dioxide from a variety of exhaust gases. A first separator 214 can be provided upstream from a first compressor 222. The first separator 214 can have a first liquid path 216, a first liquid storage 218, and a first gaseous path 220. The first separator 214 is configured to draw liquid off the exhaust gas to prevent any liquid from reaching the first compressor 222. The exhaust gas is then fed to the first compressor 222, such as a multi-stage compressor. The first compressor 222 feeds the exhaust gas to the first membrane 224. The first membrane 224 is configured to filter the exhaust gas received from the first compressor 222 that passes through the first membrane 224 into a first retentate stream 226 of exhaust gas and a first permeate stream 228 of exhaust gas. The first permeate stream 228 of exhaust gas includes a larger amount of carbon dioxide than the first retentate stream 226 of exhaust gas, as the membrane filters out other gases into the first retentate stream 226. The first permeate stream 228 connects to a first ejector 232.

A second separator 234 is configured to separate the liquid from the gas after the exhaust gas is compressed some amount by the first ejector 232. The second separator 234 can have a second liquid path 236, a second liquid storage 238, and a second gaseous path 240. A second multi-stage compressor is then used for compressing the separated $CO_2$ to the pipeline pressure.

The second membrane 260 can be located along the first retentate stream 226 of the first membrane 224. The second membrane 260 filters the gas passing through into a second retentate stream 262 and a second permeate stream 264. Instead of the first retentate stream 226 being purged from the system 200, the second retentate stream 262 can be purged from the system 200. It is appreciated that in an example that uses the first membrane 224 and the second membrane 260, the first membrane 224 easily extracts a large portion of carbon dioxide. The second membrane 260 will have a reduced flow of exhaust gas in the first permeate stream 228 due to a large portion of gas already being filtered out. A second ejector 266 is present at the second permeate side of the second membrane 260. A third separator 268 is configured to separate the liquid from the gas after the exhaust gas is compressed some amount by the second ejector 266. The third separator 268 can have a third liquid path 270, a third liquid storage 272, and a third gaseous path 274. A third compressor 276 is then used for compressing the separated $CO_2$, where the pressure can be compressed to a pipeline pressure. After the exhaust gas is compressed through the third compressor 276, the gas is directed to the first membrane 224 through a path 278 for the exhaust gas to travel from the third compressor 276. An expander 230 can be located near the end of the second retentate path to expel the material through a vent. It is appreciated that the second membrane 260 is provided to obtain additional filtration to capture an additional amount of the carbon dioxide gas.

A flow divider 244 can also be provided and can be located downstream from the second compressor 242. The flow divider 244 is configured to divert the exhaust gas that is rich in carbon dioxide received from the second compressor 242 to a carbon dioxide storage tank 250. The flow divider 244 can be used to control the discharge rate of the exhaust gas after the second multi-stage compressor to transport the carbon dioxide to a carbon dioxide storage tank 250. The flow divider 244 can also be configured to provide a first path 246 that transports exhaust gas at a specific rate such that it can be fed to the carbon dioxide storage tank 250 or to a storage facility. The flow divider 244 can be configured to provide a second path 248 that diverts a second amount of exhaust gas at a specific rate such that it can be fed to the inlet of the second ejector 266. Recycling the pressurized gas to the second ejector 266 can help to increase the pressure of the gas entering the second ejector 266 as well as helping to reduce the work required by the third compressor 276. The gas diverted will also undergo additional processing by the second ejector 266, the third separator 268, and the third compressor 276. Alternatively, the second path 148 can transport exhaust gas to the inlet of the first ejector 232.

Accordingly, the first example system 10 includes only one membrane 24 and one ejector 32 that aids in the compression process at the permeate side of the membrane. The third example system 200 provides a second membrane 260 in combination with the first membrane 224. The energy requirement for the third example system 200 can be lower in comparison to the first example system 10 as two ejectors 232, 266 are doing work in the third example system 200 meaning that the compressors 222, 242, 276 have less work that needs to be performed for a certain volume of exhaust gas. It is appreciated that other examples can include different numbers of membranes with varying numbers of ejectors and compressor stages. Further examples can be provided that include providing an ejector on the permeate side of at least one membrane to assist in compression of the gas, as opposed to requiring a compressor do all of the compression work of a $CO_2$ gas.

An example method for capturing carbon dioxide from an exhaust gas can also be provided. The first step is transporting exhaust gas to a first separator 14. The next step includes separating the exhaust gas at the first separator 14 into a gas in a first gaseous path 20 and a liquid in a first liquid path 16. The exhaust gas can then be compressed from the first gaseous path 20 at a first compressor 22. Another step includes filtering the exhaust gas from the first compressor 22 at a first membrane 24 to separate the exhaust gas received into a retentate stream 26 of exhaust gas and a permeate stream 28 of exhaust gas. The permeate stream 28 of exhaust gas includes a larger amount of carbon dioxide than the retentate stream 26 of exhaust gas. The exhaust gas from the permeate stream 28 can then be compressed at a first ejector 32. Another step in the example method is to separate the exhaust gas at a second separator 34 into a gas in a second gaseous path 40 and a liquid in a second liquid path 36. A second compressor 42 can then be used to compress the exhaust gas from the second gaseous path 40. The exhaust gas can then be transported from the second compressor 42 to a carbon dioxide storage tank 50.

In addition, the example method can include the step of purging the exhaust gas from the retentate stream 26 to a vent. The vent can expel the exhaust gas that has a reduced or negligible amount of carbon dioxide to the environment. The example method can further include the step of diverting a second portion of the exhaust gas from the second compressor 42 to the inlet of the first ejector 32 for additional processing by the first ejector 32, the second separator 34, and the second compressor 42.

The example method can further include step of filtering the exhaust gas from the first permeate stream 228 of the first membrane 224 at a second membrane 260 to separate the exhaust gas received into a second retentate stream 262 of exhaust gas and a second permeate stream 264 of exhaust gas. The second permeate stream 264 of exhaust gas includes a larger amount of carbon dioxide than the second retentate stream 262 of exhaust gas. The exhaust gas from the second permeate stream 264 can be compressed at a second ejector 266. The exhaust gas can be separated at a third separator 268 into a gas in a third gaseous path 274 and a liquid in a third liquid path 270. Another step in this further example can include compressing the exhaust gas from the third gaseous path 274 at a third compressor 276 and transporting the exhaust gas from the third compressor 276 to the inlet of the first ejector 232. The further example can also include the step of diverting a second portion of the exhaust gas from the second compressor 242 to the inlet of the second ejector 266 for additional processing by the first ejector 232, the second separator 234, and the second compressor 242.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A system for capturing carbon dioxide including:
   a feed line transporting an exhaust gas;
   a first separator configured to draw liquid off the exhaust gas;
   a first compressor configured to compress the exhaust gas;
   a first membrane configured to filter the exhaust gas received from the first compressor into a retentate stream of exhaust gas and a permeate stream of exhaust gas wherein the permeate stream of exhaust gas includes a larger amount of carbon dioxide than the retentate stream of exhaust gas;
   a first ejector, downstream of the first compressor, configured to compress the permeate stream of exhaust gas;
   a second separator configured to draw liquid off the exhaust gas received from the first ejector;
   a second compressor, downstream of the first ejector, configured to further compress the exhaust gas received from the second separator; and
   a carbon dioxide storage tank configured to receive a portion of the exhaust gas from the second compressor.

2. A system according to claim 1, further including an expander configured to expand the retentate stream of exhaust gas and transport the exhaust gas to a vent.

3. A system according to claim 1, further including a flow divider for diverting the portion of the exhaust gas from the second compressor to the carbon dioxide storage tank and diverting a second portion of exhaust gas from the second compressor to the inlet of the first ejector for additional processing by the first ejector and the second compressor.

4. A system according to claim 1, wherein the feed line transports the exhaust gas from an energy plant.

5. A system according to claim 1, further including:
   a second membrane configured to separate the exhaust gas received from the retentate stream into a second retentate stream of exhaust gas and a second permeate stream of exhaust gas;
   a second ejector, downstream of the first compressor, configured to further compress the second permeate stream of exhaust gas;
   a third compressor, downstream of the second ejector, configured to further compress the exhaust gas received from the second ejector; and
   wherein the third compressor transports the exhaust gas to the first ejector.

6. A system according to claim 5, wherein the second retentate stream of exhaust gas is purged from the system.

7. A system according to claim 5, further including a flow divider for diverting the portion of the exhaust gas from the second compressor to the carbon dioxide storage tank and diverting a second portion of exhaust gas from the second compressor to the inlet of the first ejector for additional processing by the first ejector, and the second compressor.

* * * * *